United States Patent [19]

Murakami et al.

[11] Patent Number: 4,740,905

[45] Date of Patent: Apr. 26, 1988

[54] RALLY-ORIENTED METER DEVICE FOR MOTORCYCLES

[75] Inventors: Hiroshi Murakami; Sumitaka Ogawa; Kiyoshi Takano, all of Saitama, Japan

[73] Assignee: Honda Giken Kogyo Kabushiki Kaisha, Tokyo, Japan

[21] Appl. No.: 708,122

[22] Filed: Mar. 4, 1985

[30] Foreign Application Priority Data

| Mar. 2, 1984 [JP] | Japan | 59-30326[U] |
| Mar. 5, 1984 [JP] | Japan | 59-41659 |
| Mar. 5, 1984 [JP] | Japan | 59-41660 |

[51] Int. Cl.$^4$ .............. G01C 25/00; G01C 22/00; G06F 15/14
[52] U.S. Cl. .................... 364/571; 364/424; 364/561; 235/95 R; 324/166
[58] Field of Search ............... 364/424, 446, 449, 561, 364/565, 569, 571; 434/61; 272/73; 340/323 R; 235/95 R; 324/166

[56] References Cited

U.S. PATENT DOCUMENTS

| 3,610,898 | 10/1971 | Yamamoto | 364/571 |
| 3,742,195 | 11/1971 | Randle | 377/24 |
| 3,980,868 | 9/1976 | Thompson | 364/569 X |
| 4,068,307 | 1/1978 | Floyd et al. | 235/95 R X |
| 4,074,196 | 2/1978 | Webster | 377/24 X |
| 4,167,699 | 9/1979 | Baker | 364/565 X |
| 4,176,397 | 9/1979 | Crom et al. | 364/449 X |
| 4,250,403 | 2/1981 | Nomura et al. | 377/24 |
| 4,383,302 | 5/1983 | Harris et al. | 364/565 |
| 4,443,008 | 4/1984 | Shimano | 434/61 X |
| 4,532,600 | 7/1985 | Mihara et al. | 364/565 |
| 4,587,622 | 5/1986 | Herzog | 364/571 X |
| 4,642,787 | 2/1987 | McCarthy et al. | 364/424 X |
| 4,663,718 | 5/1987 | Augello et al. | 364/551 X |
| 4,665,497 | 5/1987 | Yamamura et al. | 235/95 R X |

Primary Examiner—Parshotam S. Lall
Assistant Examiner—Joseph L. Dixon
Attorney, Agent, or Firm—Armstrong, Nikaido, Marmelstein & Kubovcik

[57] ABSTRACT

A rally-oriented meter device for motorcycles, includes a meter unit, a fixing assembly for fixing the meter unit in the vicinity of a handle bar of the motorcycle, and a sensor for detecting the number of revolutions of a front wheel of the motorcycle. The meter unit has an internal electric circuit, a display section, and an operational section. The internal electric circuit comprises an integration circuitry for an integration of a travel distance of the motor cycle. A correction circuitry provides the integration circuitry with a correction signal representing a correlation factor. The operational section comprises a calibration switch system for providing a control signal for commanding the correction circuitry to start and stop an action thereof to determine the correction factor. The display section comprises a first display element for displaying the travel distance in a predetermined unit, and a second display element for displaying the travel distance in a unit smaller than the predetermined unit. The fixing assembly is to detachably attach the meter unit in the vicinity of the handle bar. The sensor is secured to a front fork of the motor cycle and disconnectably connected through a connector to the internal electric circuit. The display section and the operational section are both provided in an upper face of the meter unit. The calibration switch system comprises a calibration switch. The calibration switch has a lower height than a top face of the display section.

31 Claims, 9 Drawing Sheets

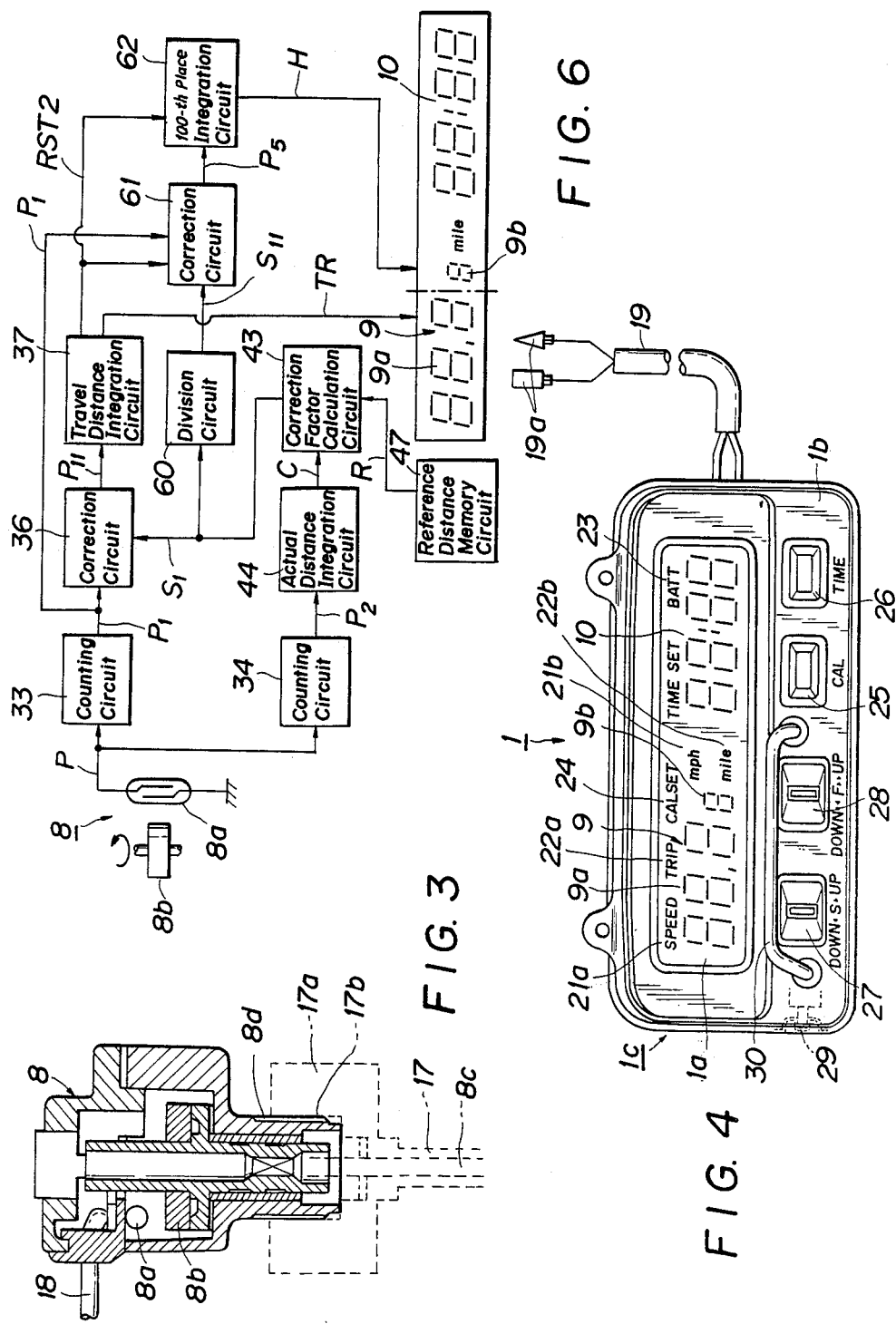

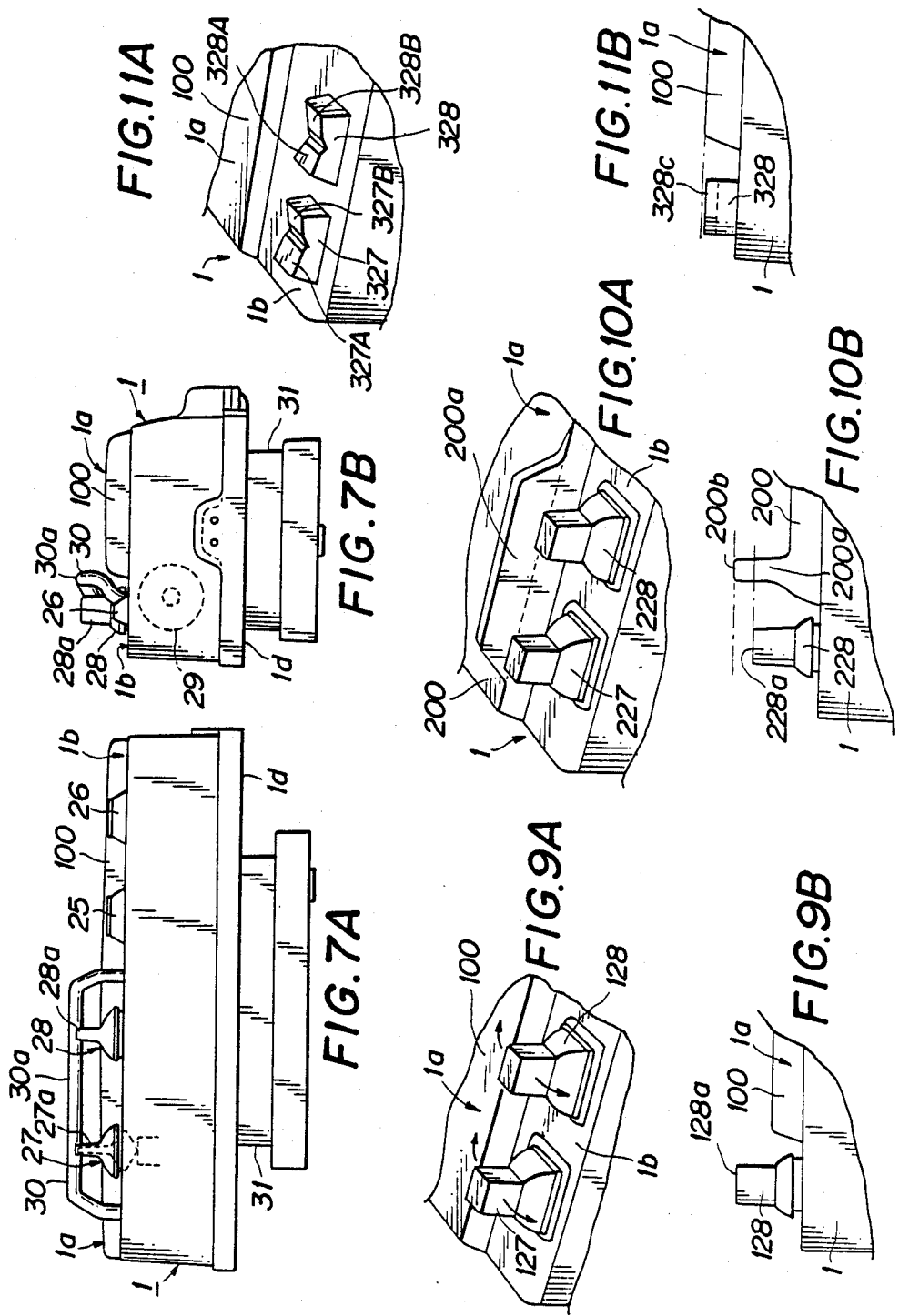

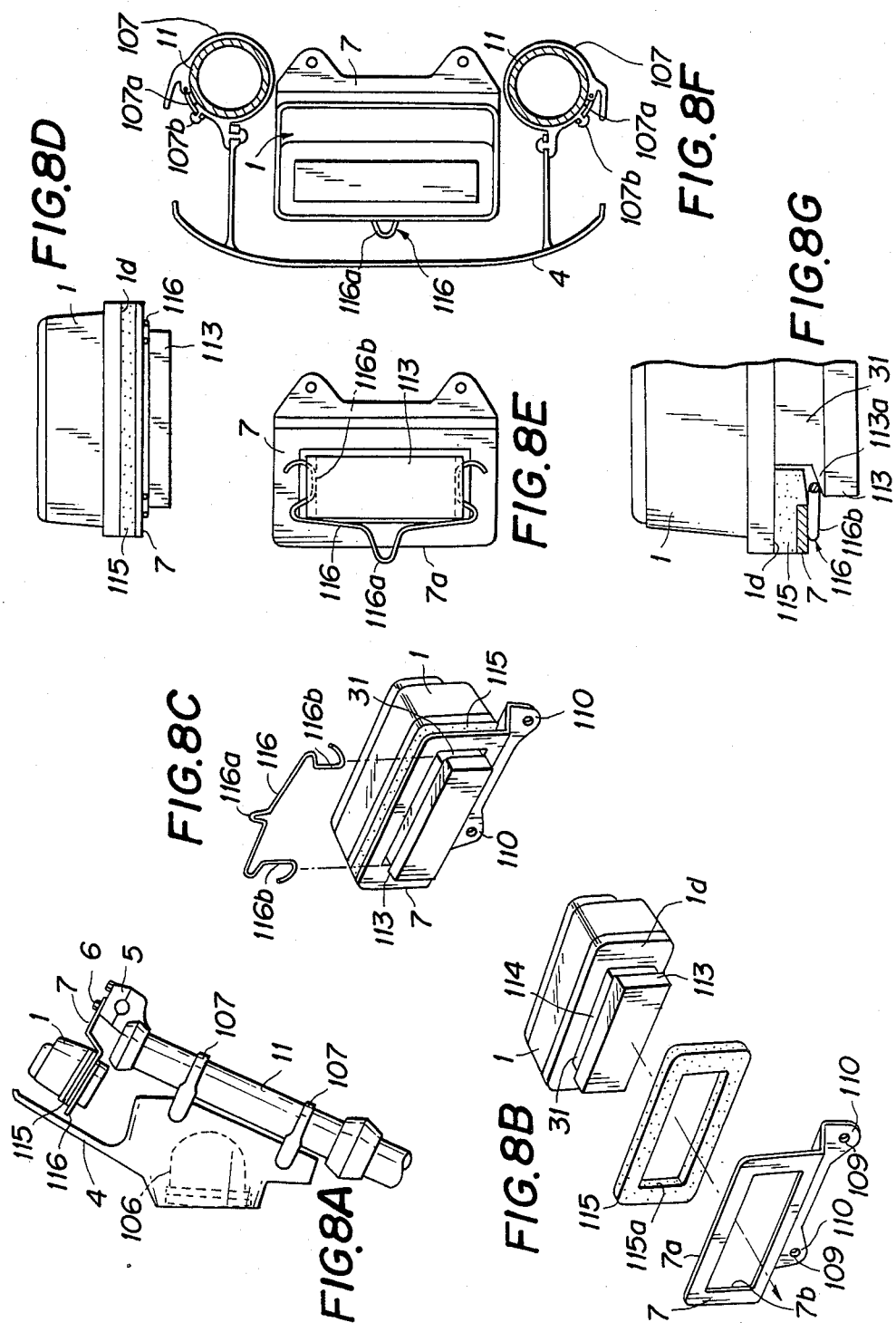

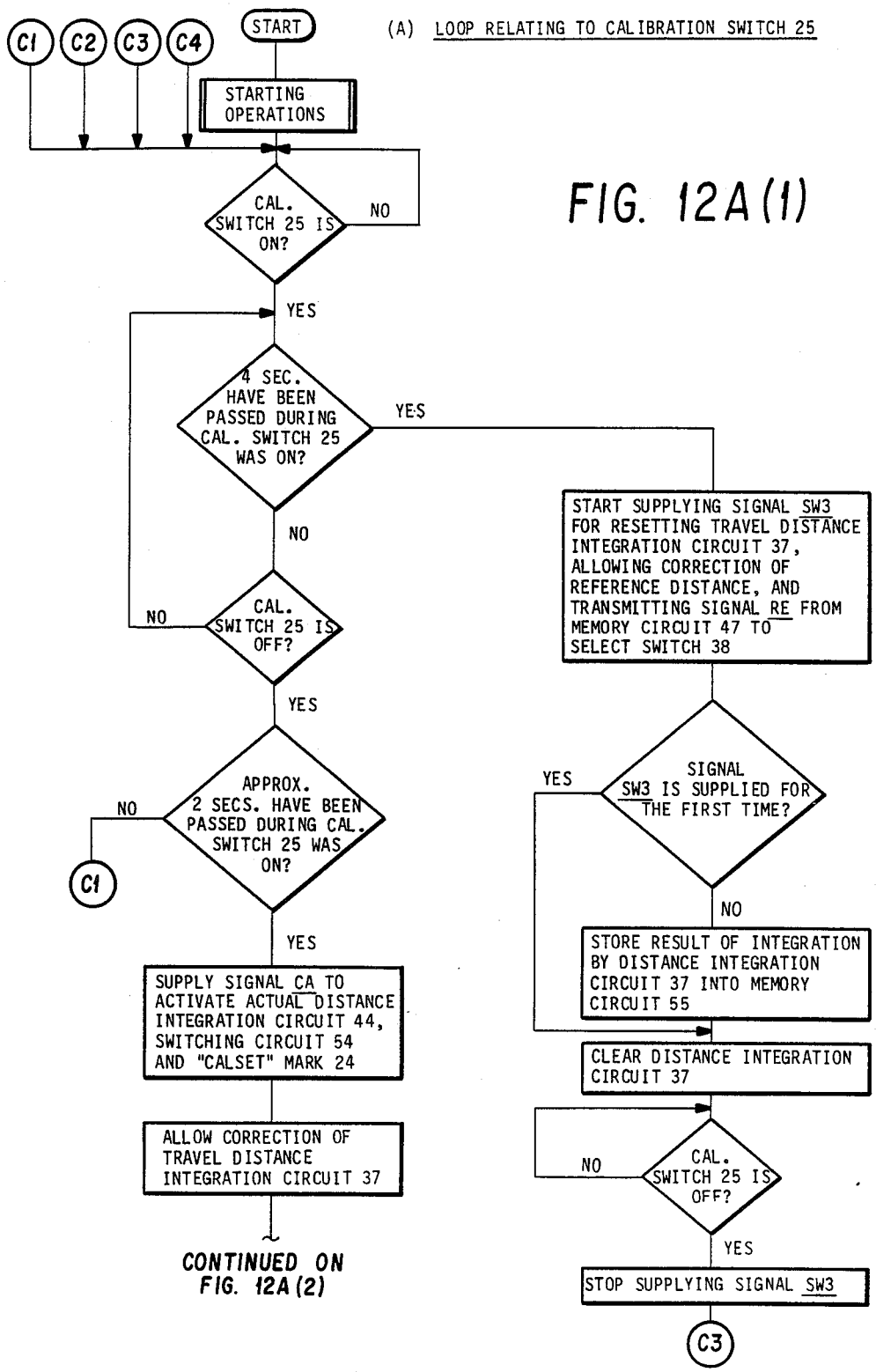

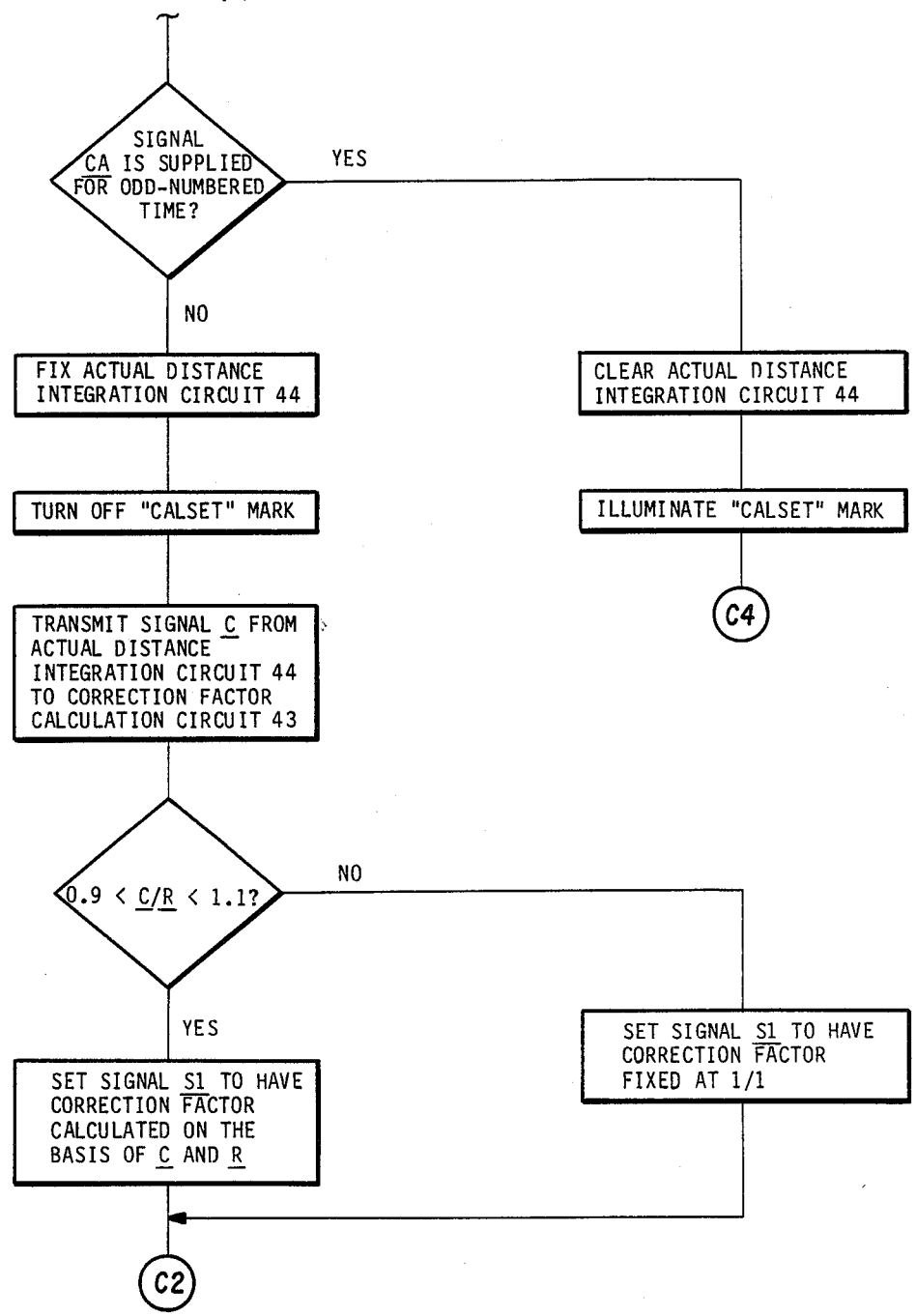
FIG. 12A(2)

(C) LOOP RELATING TO CORRECTION SWITCHES 27 & 28

RALLY-ORIENTED METER DEVICE FOR MOTORCYCLES

BACKGROUND OF THE INVENTION

1. Field of the Invention

The present invention relates generally to a meter device. More particularly, the invention relates to a rally-oriented meter device for motorcycles and the like.

2. Description of Relevant Art

A competition race using a motorcycle is known as enduro in which, along a course such as a mountain path, an emulation is made about how correctly each section of the course could be travelled at a specified speed in accordance with a given chart. Therefore, in the enduro, a driver of each motorcycle needs to alternately compare a clock, a speedometer, and an odometer, as well as the given chart during the race.

There has been already proposed a rally-oriented meter device for motorcycles, in which a clock, a speedometer, and an odometer are assembled together into a meter unit. For a driver having the conventional rally-oriented meter device equipped to his or her own vechicle, a facilitation is made available in a race, such that he or she can travel, seeing indications of the clock and the odometer, as well as of the speedometer, on the meter unit, while comparing them with a specified travel distance at each specified travel time on a given chart prepared by the sponsor, to grasp deviations of the individual vehicle from the specifications for travel, in order to achieve an average vehicle speed as specified.

In the enduro, in an initial stage after the opening of the race, an official standard vehicle of the sponsor travels with entrant vehicles, from the start point of the race to an appointed point on the course thereof, for example to a 3-mile point, to permit each entrant to calibrate by comparison a travel distance characteristic of his or her own vehicle with that of the standard vehicle. The score of the race is determined in accordance with the travel distance characteristic of the standard vehicle.

In such a race, with the conventional rally-oriented meter device, a correction for the calibration is permitted to be made no more than one time, that is, only in an initial stage after the opening of race. In other words, such a correction can not be effected thereafter, thus making it difficult for a driver to cope with the varying situation of the course. Particularly, in the enduro, in which the race is usually divided into a morning part and an afternoon part or by hours, such comparative calibration is difficult for the driver to make of respective standard vehicles by such parts or hours.

Moreover, in the conventional rally-oriented meter device, the odometer is constituted with a numerical display having the same number of figures as numerals for travel specification in the given chart, so that the aforesaid grasp of deviation is rather difficult for the driver to make with accuracy.

Further, in the conventional meter device, the meter unit is usually fixed to a motorcycle by a fastening means such as a combination of bolts and nuts, thus being disadvantageous in such points that (a) the detachment from the motorcycle as well as the attachment thereto is troublesome to make, (b) the device must be hand-carried to prevent mischief and theft, (c) shocks are directly given from the motorcycle to the device while travelling, and (d) a large number of components are employed for attachment of the device to the motorcycle.

Furthermore, in the conventional meter device, a sensor for detecting a vehicle speed is built in the meter unit. The sensor is connected a cable for mechanically transmitting the number of revolutions (i.e., speed) of a road wheel, so that the meter unit is likely to receive mechanical shocks from the cable.

Also, in the conventional meter device in which a power switch and/or some operational switch or switches such as for changing or correcting indication mode or content of indication of the meter unit or the like is or are disposed on the rear side of a casing of the meter unit, there is a desideratum for facilitation of switch operation.

Additionally, in the conventional meter device in which such switch or switches is or are disposed on the front side of the meter unit, while being projected therefrom, an erroneous switch may be touched by the driver. Particularly, in the rally-oriented meter device, which has stored therein various data such as a travel distance as integrated during the race, such data may change or disappear upon the driver's unintentional touch onto such switch or switches.

The present invention has been achieved to effectively overcome the problems of a conventional rally-oriented meter device for motorcycles.

SUMMARY OF THE INVENTION

According to the present invention, there is provided a rally-oriented meter device for a motorcycle having a handle bar and a road wheel, comprising a meter proper, a fixing means for fixing the meter proper in the vicinity of the handle bar, a revolution number sensor (i.e., speed sensor) for detecting a number of revolutions of the road wheel, an internal circuit means built in the meter proper for receiving an output signal from the revolution number sensor, a power source means for supplying an electric power to the internal circuit means, a display means disposed on the outside of the meter proper for receiving an output signal from the internal circuit means and for displaying at least a travel distance of the motorcycle, and a switch means disposed on the outside of the meter proper and operatively connected to the internal circuit means to provide a control signal to the internal circuit means. The internal circuit means includes a travel distance integration circuit means for receiving the output signal from the revolution number sensor to execute an integration of the travel distance and for providing a drive signal representing a content of the integration of the travel distance to the display means. A correction signal providing circuit means provides a correction signal representing a correction factor for correcting a content of the output signal from the revolution number sensor to the travel distance integration circuit means. The switch means includes a calibration switch means for providing the control signal indicating a starting of and a stopping of an action to determine the correction factor to the correction signal providing circuit means.

The display means may comprise a travel distance display part having a first display element for displaying the travel distance of the motorcycle in a predetermined unit by a first predetermined number of figures, and a second display element for displaying the travel distance in a unit smaller by one place than the predetermined unit by a second predetermined number of figures. The internal circuit means may further include a referential distance integration circuit means for receiving the output signal from the revolution number sensor and the correction signal from the correction signal providing circuit means and for providing a drive signal to the second display element.

The fixing means may be for detachably fixing the meter proper in the vicinity of the handle bar.

The revolution number sensor (speed sensor) may be fixed in the vicinity of the upper part of a front fork of the motorcycle, and disconnectably connected through a connector means to the internal circuit means in the meter proper.

The fixing means may be for fixing the meter proper in front of a substantially central part of the handle bar of the motorcycle. The display means and the switch means on the meter proper may comprise a display section provided in an upper face of the meter proper and a switch group disposed in an operational section provided in the upper face of the meter proper, respectively. The upper face of the meter proper may have, between the display section and the operational section, a stepped portion for making a top face of the display section higher than the operational section. The switch group may comprise at least a calibration switch constituting the calibration switch means, and the calibration switch may comprise a press-on type switch projecting from the operational section to have a top face thereof lower than the top face of the display section.

Accordingly, an object of the present invention is to provide a rally-oriented meter device for motorcycles, which permits a travel distance characteristic thereof to be repeatedly calibrated, as necessary.

Another object of the present invention is to provide a rally-oriented meter device for motorcycles, which permits a deviation of an individual vehicle to be accurately grasped with respect to a specification for travel.

Still another object of the present invention is to provide a rally-oriented meter device for motorcycles, which is easy to attach to and detach from a vehicle.

It is another object of the present invention is to provide a rally-oriented meter device for motorcycles, which is effectively protected against mechanical shocks from a sensor cable.

It is still another object of the present invention to provide a rally-oriented meter device for motorcycles, which is ready to respond an intentional operation and effectively prevents unintentional operations.

The above and further objects, details and advantages of the present invention will become apparent from the following detailed description of a preferred embodiment of the invention when read in conjunciton with the accompanying drawings.

BRIEF DESCRIPTION OF THE DRAWINGS

FIG. 3 is an enlarged longitudinal sectional view of a vehicle speed sensor of the meter device of FIG. 2.

FIG. 4 is an enlarged top view of a meter unit of the meter device of FIG. 2.

FIG. 6 is a block diagram of the circuitry for driving the display element and associated circuits of the interal electric circuit of FIG. 5.

FIG. 7A is a rear view of the meter unit of FIG. 4.

FIG. 7B is a right side view of the meter unit of FIG. 4.

FIGS. 8A to 8G are drawings describing a fixing system of the meter unit to the motorcycle, excluding switches and leading wires, in which:

FIG. 8A is a side view of an essential part of the motorcycle, for fixing the meter unit;

FIG. 8B is an exploded view of the meter unit;

FIG. 8C is a perspective view of the meter unit;

FIG. 8D is a rear view of the meter unit as fixed;

FIG. 8E is a bottom view of the meter unit as fixed;

FIG. 8F is a top view of the meter unit as fixed; and

FIG. 8G is an enlarged partial view of the meter unit as fixed.

FIGS. 9A and 9B are views describing a correction switch of a rally-oriented meter device according to a first modified example of the embodiment, respectively.

FIGS. 10A and 10B are views describing a correction switch of a rally-oriented meter device according to a second modified example of the embodiment, respectively.

FIGS. 11A and 11B are views describing a correction switch of a rally-oriented meter device according to a third modified example of the embodiment, respectively.

FIGS. 12A–12C are flow charts for the calibration switch, timing switch and correction switches.

DETAILED DESCRIPTION OF THE PREFERRED EMBODIMENT

Figure 1:
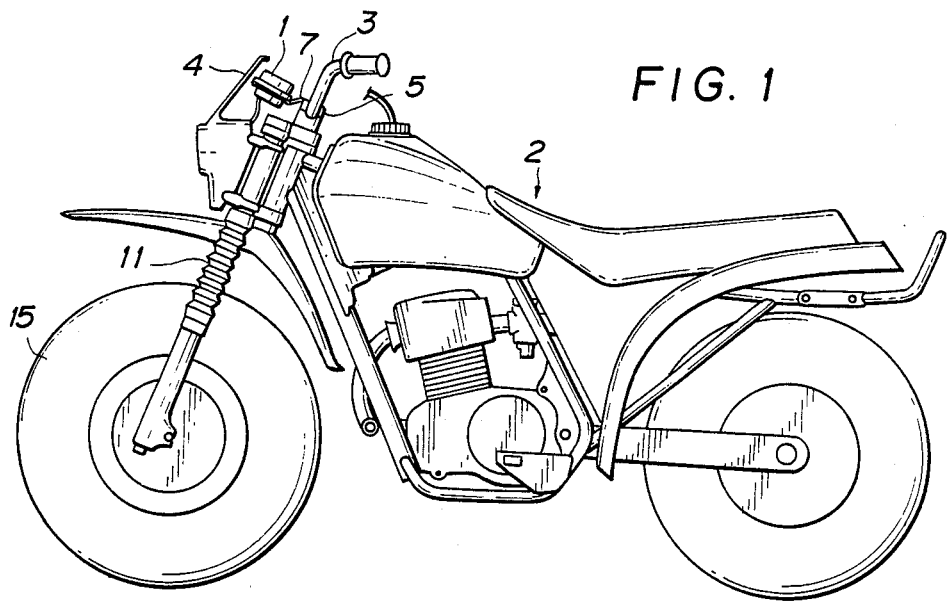
FIG. 1 is a left side view of a motorcycle equipped with a rally-oriented meter device according to the preferred embodiment of the invention.

Referring first to FIG. 1, designated at reference numeral 1 is a box-like meter unit as a meter proper of a rally-oriented meter device according to the preferred embodiment of the invention. The meter unit 1 is to be mounted on an offroad-oriented motorcycle 2, in the vicinity of a handle bar 3 thereof. More definitely, the meter unit 1 according to the embodiment is designed to be installed, between the handle bar 3 and a racing number plate 4 standing in front thereof, on a stay 7 fixed by left and right bolts 6 to an upper holder 5 of the handle bar 3. The holder 5 is also fixed by the bolts 6.

Figure 2:
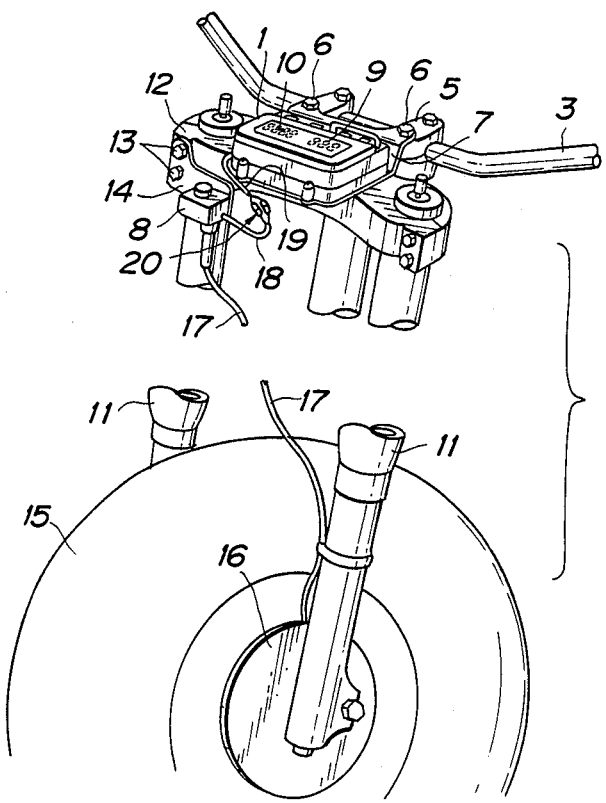
FIG. 2 is an enlarged perspective view, partly in section, of essential parts of the motorcycle, showing fixing positions of the meter device of FIG. 1.

Referring now to FIG. 2, the meter unit 1 is detachably fixed to the stay 7 by means of a fixing structure later-described herein with reference to FIGS. 8A to 8G, whereby a driver of the motorcycle 2 is permitted to attach and detach the meter unit 1 to and from a vehicle body of the motorcycle 2 with ease, so that the meter unit 1 itself is transportable.

The meter unit 1 has therein an unshown cell as a power source and a later-detailed internal electric circuit receiving a revolution number signal or speed of revolution signal from a revolution number sensor 8 disposed at a position distant from the meter unit 1. The circuit is for the calculation of a vehicle speed of the motorcycle 2 and the integration of a travel distance thereof. In the top face of the meter unit 1, at the left, is provided a display part 9 receiving a drive signal from the electric circuit to display the vehicle speed or the travel distance, whichever is voluntarily selectable in a later-described manner. The meter unit 1 further contains, as will be detailed later, a clock circuit functioning as a timer in cooperation with a built-in oscillator, and another display part 10 disposed in the top face of the meter unit 1, at the right. The display part 10 gives a time indication in accordance with a drive signal from the clock circuit.

The revolution number sensor 8 (speed sensor) is fixedly mounted on a stay 14 secured with bolts 13 to a top bridge 12 which holds both upper ends of a front fork 11 supporting a front wheel 15 of the motorcycle 2. A leading wire 18 of the sensor 8 is connected to a leading wire 19 as an input line of the meter unit 1 so as to be voluntarily disconnectable therefrom by means of a connector 20.

Referring now to FIG. 3, which is a longitudinal sectional view of the revolution number sensor 8, the speed sensor 8 has built therein a reed switch 8a sensitive to magnetic flux and a magnet 8b disposed in the vicinity of the reed switch 8a. The read switch 8a is electrically connected to the leading wire 18. The magnet 8b is mechanically connected to a cable 8c lead from a gearbox (not shown) provided in a hub 16 of the front wheel 15. The cable 8c and hence the magnet 8b also is to revolve in accordance with the number of revolutions of the front wheel 15. The cable 8c is sheathed in an outer member 17, which has at the upper end thereof a socket 17 formed with a female thread portion 17b screwed on a male thread portion 8d formed on the lower part of the sensor 8.

With such an arrangment, the sensor 8 is to supply a later-described pulsatory signal according to the number of revolutions of the front wheel 15, through the leading wires 18, 19 to the internal electric circuit of the meter unit 1.

The cable 8c may be subjected to considerable shocks while the offroad-oriented motorcycle 2 is travelling. However, according to the invention, the cable 8c is connected to the sensor 8 which is separately disposed to be spaced apart from the meter unit 1, so that the meter unit 1 receives no mechanical shocks transmitted through the cable 8c and is successfully kept free from such shocks.

Moreover, in comparison with a conventional arrangement in which a revolution number sensor is provided in a hub portion of a front wheel, the sensor 8 according to the invention, which is mounted on the upper part of the front fork 11, can be effectively protected against mud, water, and the like.

In this respect, not limiting to the foregoing embodiment, a revolution number sensor according to the invention may be installed in any place about a handle bar, on the upper part of a front fork, or in a similar space that is protected by a race number plate.

Referring now to FIG. 4, which is a top view of the speed sensor 8, the sensor 8 has in the upper face thereof a display section 1a consisting of the left and right display parts 9, 10, and an operational section 1b provided with later-described operational switches. The display section 1a is constituted as a digital indication system, in which the left display part 9 alternatively displays the travel distance and the vehicle speed of the motorcycle 2. The display comprises a combination of three digit indication elements 9a representing at most three figures of an arbitary numeral as a value of the travel distance or vehicle speed, ranging to and including a lowest place of one decimal (hereinafter called one-tenth place) and another digit indication element 9b representing one figure at the second decimal place (hereinafter called one-hundredth place) of the abovearbitrary numeral. The right display part 10 comprises a combination of four digit indication elements, one pair for the minute indication and the other pair for the second indication. Each digit indication element is made by use of a liquid crystal indicator. For easy comprehension, FIG. 4 is showing a state in which each liquid crystal indicator is turned on.

The left display part 9 serves as a travel distance meter or vehicle speed meter in accordance with a later-described selecting operation. The display section 1a has a number of mode indication marks, in which "SPEED" mark 21a and "mph" mark 21b are driven to illuminate while the left display part 9 is serving as a vehicle speed meter, that is, in a speed indication mode, "TRIP" mark 22a and "mile" mark 22b become illuminant when the display part 9 is selected to serve as a travel distance meter, that is, in a distance indication mode "CALSET" mark 24 is lit in a later-described calibration mode, whereas "BATT" mark 23 is to start flashing when power of the built-in cell has faded to be insufficient for service.

In the operational section 1b, there are provided a calibration switch 25 for calibration purpose, a timing switch 26 for indication mode selection, and a combination of correction switches 27, 28 of a seesaw type. The correction switches 27, 28 are for correcting the indication of the left display part 9 in the travel indication mode and the time indication of the right display part 10 at voluntarily selectable one of two different speeds, that is, slowly or fast.

Moreover, on a left side wall 1c of an outer casing of the meter unit 1, there is provided a power switch 29 for turning on and off power supply to the internal electric circuit of the meter unit 1. The power switch 29 is designed to be projectable from and sinkable into the side wall 1c.

In FIG. 4, designated at reference character 19a are terminals of the connector 20 for connecting the leading wire 19 of the meter unit 1 to the leading wire 18 of the revolution number sensor 8. Reference numeral 30 is a protection bar for protecting the correction switches 27, 28 from being accidentally touched by the driver.

In the above-described left display part 9 of the meter unit 1, the digit indication element 9b corresponding to the one-hundredth place is smaller in the size than each of the three digit indication elements 9a, and may preferably be approximately ⅔ of the latter in both height and width dimensions. Further, the indication element 9a may preferably be different from the indication elements 9b with respect to the display color of the liquid crystal indicator.

The configuration of the meter unit 1 including the respective switches 25 to 29 and the fixing system thereof to the stay 7 will be detailed hereinlater in conjunction with FIGS. 7A, 7B and FIGS. 8A to 8G, respectively.

Figure 5:
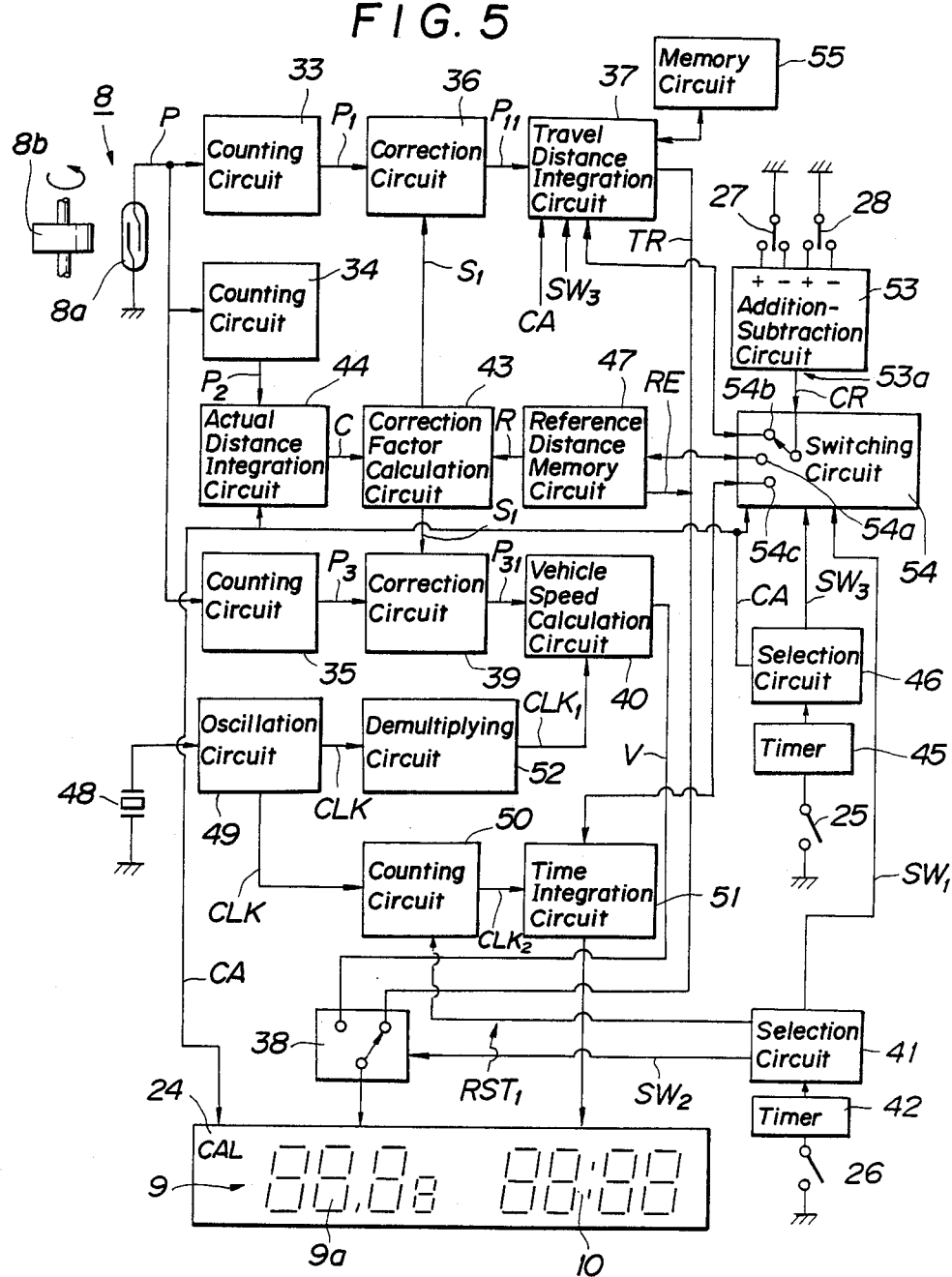
FIG. 5 is a block diagram substantially of the entirety of an internal electric circuit of the meter unit of FIG. 4, excluding a circuitry for driving a display element.
Figure 12B:
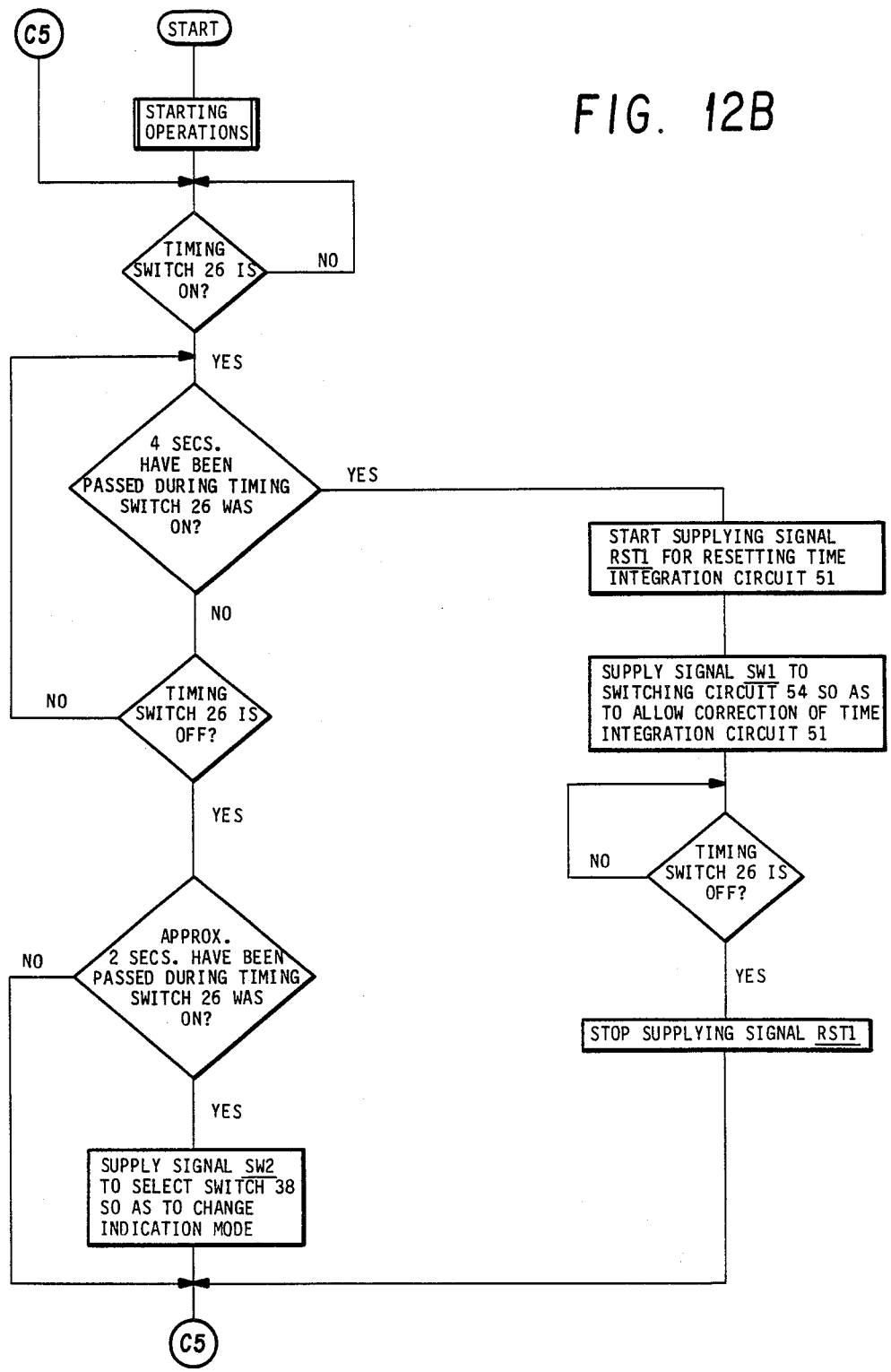
Figure 12C:
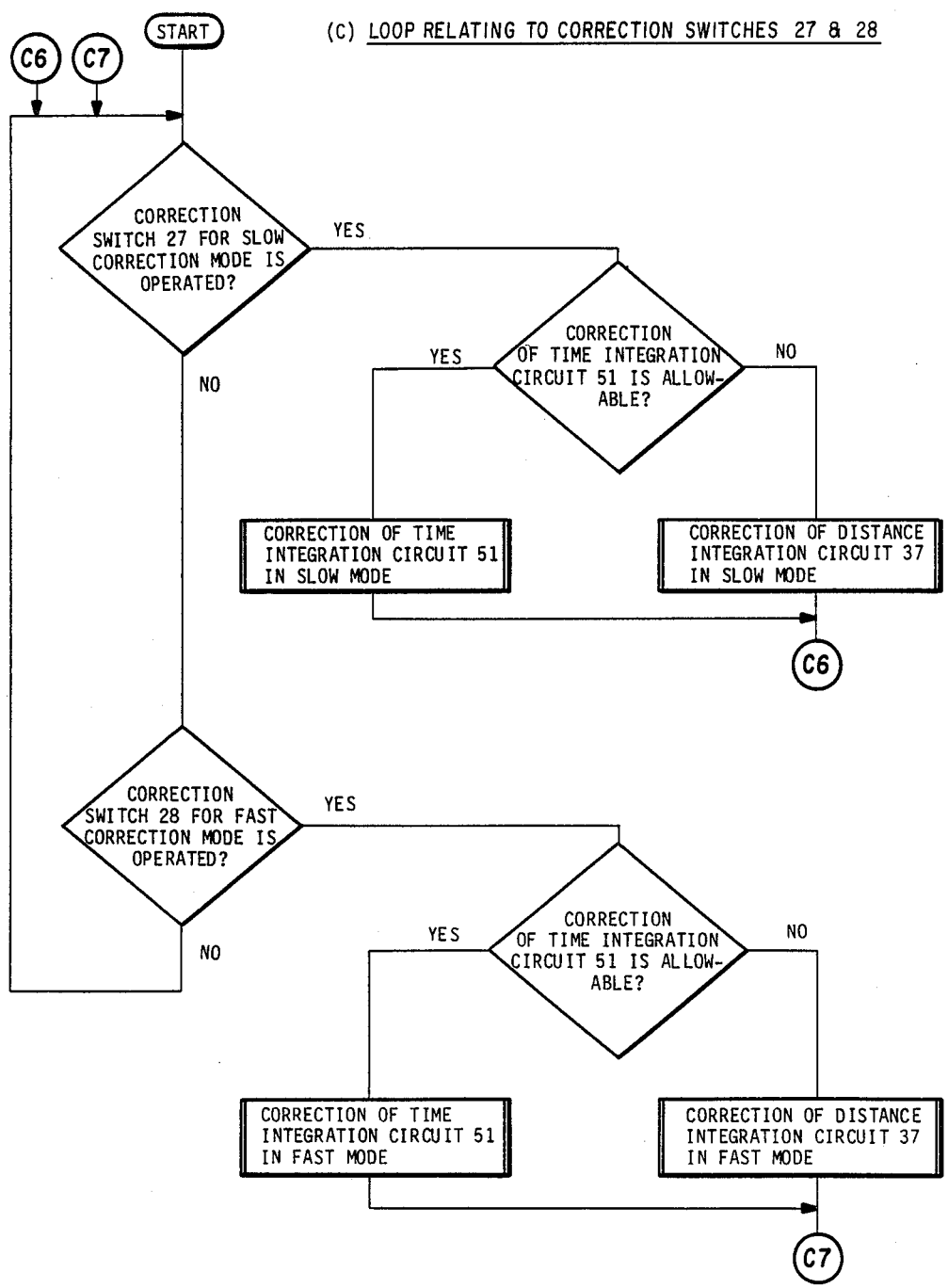

The internal electric circuit of the meter unit 1 will be detailed below with reference to FIG. 5 showing a block diagram substantially of the entirety of the internal electric circuit, excluding the circuitry, which will be described later with reference to FIG. 6, for driving the digit indication element 9b of the one-hundredth place in the left display part 9.

When the power switch 29 of the internal electric circuit is turned on, electric power is supplied from the cell as power source to the entirety of the circuit. In accordance with a number of revolutions (speed) of the front wheel 15 of the motorcycle 2, the magnet 8b is mechanically driven to revolve, causing the reed switch 8a to output a pulsatory revolution number signal P correspondent to the revolution of the magnet 8b. As will be easily understood, the revolution number signal P has a pulsatory signal wave occurring at intervals variable in accordance with the vehicle speed of the motorcycle 2.

The pulsatory revolution number signal P is input to a counting circuit 33 for distance integration, another counting circuit 34 for correction control, and still another counting circuit 35 for speed calculation, respectively. The counting circuit 33, 34, and 35 are to react to the pulsatory signal wave of the signal P and, correspondingly thereto, provide revolution number count signals P1, P2, and P3, respectively. Each of the count signals P1, P2, and P3 is given in the form of a pulse signal of a rectangular wave.

The revolution number count signal P1 from the counting circuit 33 is input to a correction circuit 36 as a variable multiplication-demultiplication circuit, wherefrom a corrected revolution number signal P11 is output to a travel distance integration circuit 37. The corrected signal 37 has a pulse wave occurring at various intervals each having a number of pulses, correspondent to one-tenth miles, given by the count signal P1 to the correction circuit 36, in accordance with the content of a later-described correction signal S1 input from a correction line to the circuit 36. From the integration circuit 37, in which the travel distance of the motorcycle 2 is calculated by integration in a unit of one-tenth miles, a distance display drive signal TR is sent through a select switch 38, which is to select the indication mode of the left display part 9 to be of the travel distance or vehicle speed, to the three digit indication elements 9a. As a result, the travel distance as determined at the integration circuit 37 is displayed on the display part 9.

The revolution number count signal P3 from the counting circuit 35 is input to another correction circuit 39 as a variable multiplication-demultiplication circuit of a speed line, where it is multiplied or demultiplied in accordance with the correction signal S1 as input from the correction line to this circuit 39, to thereby provide a corrected revolution number signal P31 in the form of a pulse signal to be output to a vehicle speed calculation circuit 40.

On the other hand, the internal electric circuit of the meter unit 1 has an oscillating element 48 and an oscillating circuit 49 cooperating therewith to provide an oscillating clock signal CLK of a predetermined frequency. The clock signal CLK is input to a demultiplying circuit 52, where it is demultiplied to obtain a clocking signal CLK1 to be supplied to the vehicle speed calculation circuit 40.

At the calculation circuit 40, the vehicle speed of the motorcycle 2 is calculated based on the corrected revolution number signal P31 and the clocking signal CLK1 and, from the circuit 40, a speed display drive signal V is sent through the select switch 38 to the three digit indication elements 9a. The select switch 38 is correspondingly changed over by operating the timing switch 26 in a later-described manner. In this case, the vehicle speed as calculated at the circuit 40 is displayed on the left display part 9.

The clock signal CLK is input also to yet another counting circuit 50 as a time counter of a clock line, wherefrom a clock counter signal CLK2 is supplied to a time integration circuit 51. At the integration circuit 51, an associated elapse of time is integrated based on the count signal CLK2, to be constantly output as a clock display drive signal T to the right display part 10 of the display section 1a. The counting circuit 50 is to have, when it is given a later-described reset signal RST1, a reset pulse involved in the count signal CLK2. The reset pulse has a duration several hundreds times longer than a normal pulse of the signal CLK2 and clears the time integration of the integration circuit 51 to zero or reset. In such a case, an indication of 00:00 is promptly given on the right display part 10.

To the internal electric circuit, the aforementioned timing switch 26 serves as a select switch to be kept on only while being pressed. The switch 26 has two applicable methods of operation: a short-period operation in which the switch is pressed for approximately two seconds and a long-period operation in which the switch is pressed for approximately four seconds. The specific operation is identifiable, when exercised, by means of a selection circuit 41 provided with a timer 42.

In the long-period operation, when the timing switch 26 is pressed longer than four seconds, the selection circuit 41 continues supplying the reset signal RST1 to the counting circuit 50 of the clock line and a switch drive signal SW1 to a switching circuit 54. The switching circuit 54 is to have, while being given the switch drive signal SW1, a clock line terminal 54c thereof interconnected with an output terminal 53a of an addition-subtraction circuit 53. The circuit 53 cooperates with the correction switches 27, 28 for slow or fast correction. With such an interconnection made between the terminals 53a, 54c, the time integration circuit 51 is to have a current content of integration thereof corrected, when it is given a correction signal CR from the correction switches 27, 28 through the addition-substraction circuit 53.

When the timing switch 26 is released, after being kept pressed for four seconds or more, the selection circuit 41 stops supplying the reset signal RST1 to the clock line, so that the time integration circuit 51 as well as the counting circuit 50 therefor is restored to function for proper time integration.

In the case where the timing switch 26 is released after being pressed for no more than approximately two seconds, the selection circuit 41 supplies another switch drive signal SW2 to the select switch 38, whereby a mode change is to be made between the distance indication mode and the speed indication mode of the left display part 9.

The correction circuit 36 of the distance line, as well as the correction circuit 39 of the speed line, serves as a comparison correcting means for making a travel distance characteristic of an individual vehicle, that is, of the motorcycle 2 accord with a travel distance characteristic of an official standard vehicle. At the correction circuit 36 and 39, the revolution number count signals P1 and P3 from the counting circuit 33 of the distance line and the counting circuit 35 of the speed line are multiplied or demultiplied in accordance with a correction control signal as the aforesaid correction signal S1 input thereto from a correction factor calculating circuit 43 of the correction line, whereby the count signals P1 and P3 are corrected to be output as the corrected revolution number signals P11 and P31, respectively. In the correction control signal S1 from the correction factor calculating circuit 43, there is coded a correction factor based on a comparison of the individual vehicle's travel distance with the standard vehicle's travel distance as stored in the internal electric circuit. The correction factor is given in the form of a varying ratio, whereas it has an initial value of (one to one) left substantially uncorrected until the comparison for correction is first made with the standard vehicle at a point of three miles from the start point of a race.

In the correction line, the revolution number count signal P2 from the counting circuit 34 is input to an actual distance integration circuit 44, in which the number of pulses of the count signal P2 is counted, as it is, to be processed for the integration of an actual distance of the individual vehicle. The acutal distance integration circuit 44 is connected to a calibration circuitry constituted with the calibration switch 25, a timer 45, and a selection circuit 46, whereby a calibration command signal CA is supplied from the selection circuit 46 to the integration circuit 44 in accordance with on-off operations of the calibration switch 25.

The calibration switch 25 is to function as a select switch of a type similar to the timing switch 26 which is kept on only while being pressed. Also to the calibration switch 25, there are two applicable methods of operation: a short-period operation in which the switch is pressed for approximately two seconds and a long-period operation in which the switch is pressed for approximately four seconds. The specific operation is identifiable, when exercised, by the selection circuit 46 cooperating with the timer 45.

In the long-period operation, while the calibration switch 25 is pressed longer than four seconds, the selection circuit 46 continues supplying a switch drive signal SW3 to the switching circuit 54, to thereby interconnect a correction line terminal 54a of the switching circuit 54 with the output terminal 53a of the addition-subtraction circuit 53. The drive signal SW3 is sent as a reset signal to the travel distance integration circuit 37 also, to thereby clear or zero the content of integration of the integration circuit 37. With such an interconnection made between the output terminal 53a and the correction line terminal 54a, which is connected to a reference distance memory circuit 47 to store therein a reference distance, the memory circuit 47 is to have a current value of the reference distance corrected with the correction switches 27, 28, when they are operated. While the switching circuit 54 is driven to activate the correction line terminal 54a, the memory circuit 47 outputs a distance display drive signal RE having coded therein the reference distance as then stored in the circuit 37. The drive signal RE is transmitted to the select switch 38, through the same route as the distance display drive signal TR from the travel distance integration circuit 37. The signal RE from the circuit 47 is made prior to the signal TR from the circuit 37 by means of a logic circuit (not shown). As a result, while the signal RE is given, so far as the select switch 38 is set in a position thereof for the travel indication mode, the reference distance as stored in the memory circuit 47 is displayed on the right display part 9 of the display section 1a. In this respect, the reference distance is usually set at three miles.

In the short-period operation, when the calibration switch 25 is released after being pressed for no more than approximately two seconds, the selection circuit 46 outputs the calibration command signal CA to the actual distance integration circuit 44, the switching circuit 54, and the "CALSET" mark 24 on the display section 1a.

Accordingly, while the calibration command signal CA is given for an arbitrary odd-numbered time after the power switch 29 has been once turned on, the content of integration of the actual distance integration circuit 44 is cleared to zero and the "CALSET" mark 24 becomes illuminant. To the contrary, while the command signal CA is given for the even-numbered time subsequent to the odd-numbered time, the integration circuit 44 has a fixed content of integration and the mark 24 is turned off.

For example, the calibration switch 25 is operated at the start point of the race to produce the calibration command signal CA for the first time after power application, and the switch 25 is operated at the point of three miles to produce the signal CA for the second time, respectively. Moreover, similar results will be obtained when likewise producing the signal CA for the third time at a voluntary point in a course of the race after having reset the reference distance of the reference distance memory circuit 47 as circumstances require, and when producing the same for the fourth time at a point of the course where the individual vehicle is to have travelled the reference distance as then stored in the memory circuit 47, respectively. The on-off operations of the calibration switch 25 to achieve such effects will be voluntarily repeated also thereafter.

In the correction line, when given the calibration command signal CA for an arbitrary even-numbered time, the actual distance integration circuit 44 outputs the content of integration thereof in the form of an actual distance signal C to be input for correction use to the correction factor calculation circuit 43. At the calculation circuit 43, a determination is first made as to whether or not the actual distance as an integral value represented by the distance signal C is within a range of 90% to 110% of the current value of the reference distance as represented by a reference distance signal R input from the reference distance memory circuit 47. When the integral value is not lying within the range, then it is concluded that the calibration command signal CA for the even-numbered time is erroneously produced earlier or later than required, and the correction control signal S1 as output thereafter is to have the correction factor fixed at the 1/1 value. On the other hand, in the case where the integral value is found within the described range, the correction factor coded in the control signal S1 is to have a certain value calculated on the basis of respective contents of the actual distance signal C and the reference distance signal R. As described before, when given the control signal S1, the correction circuit 36 of the distance line and the correction circuit 39 of the speed line multiply or demultiply the revolution number count signal P2 and P3 in accordance with the signal S1, to thereby obtain the corrected revolution number signal P11 and P31, respectively.

With respect to the long-period operation of the calibration switch 25, when the switch drive signal SW3, as the reset signal from the selection circuit 46, is given to the travel distance integration circuit 37 for the first time after power application, the content of integration of the integration circuit 37 is simply cleared to zero. At any time thereafter, however, when the drive signal SW3 is given, the content of integration of the integration circuit 37 is to be sent to a memory circuit 55 and stored therein, before being cleared from the circuit 37.

The travel distance integration circuit 37 receives the calibration command signal CA as well from the selection circuit 46, in the short-period operation of the calibration switch 25. Only when given two times the calibration command signal CA after having once received the switch drive signal SW3, the integration circuit 37 is to receive a stored content of the memory circuit 55 to have the same added to the content of integration as built up till then in the circuit 37 itself. However, when given to the integration circuit 37 by any other sequence, the calibration command circuit CA is to be neglected by the circuit 37. In this respect, it is advisable that, when the power switch 29 is turned on, the content as previously stored in the memory circuit 55 is initialized to zero.

With such cooperation between the integration circuit 37 and the memory circuit 55, a total travel distance from the start point to a current point of the course is successfully prevented from being deviated, even during a mistaken calibration operation.

In consideration of the process sequences of the calibration command signal CA at the travel distance integration circuit 37 and at the actual distance integration circuit 44, each calibration after the second time may be independently effected on the side of the actual distance integration circuit 44 and the correction factor calibration circuit 43, without temporarily storing the content of integration of the travel distance integration circuit 37 in the memory circuit 55, that is, without giving the switch drive signal SW3.

The calibration command signal CA is supplied to the switching circuit 54 also, as already described. When given the command signal CA, the switching circuit 54 has a distance line terminal 54b thereof interconnected with the output terminal 53a of the addition-substraction circuit 53, so that the content of integration of the travel distance integration circuit 37 is correctable by the correction switches 27, 28. Accordingly, even when the individual vehicle has failed to travel along a correct course of the race, the travel distance can be adjusted with ease.

There will be described below an operation procedure of the meter unit 1 to be followed in accordance with the advance of the race.

First, prior to a start time of the race, before the driver stands on the start point, the power switch 29 on the side wall 1c of the outer casing of the meter unit 1 is to be turned on by pushing. Respective circuits in the meter unit 1 are now applied with electric power, and become ready for service. The power switch 29 is sunken in the side wall 1c, to be flushed therewith, without projecting therefrom. Therefore, during the race, the switch 29 is favorably prevented from being physically touched, except for intentional pushing actions. In this respect, the switch 29 is designed to be of a size that permits the driver to operate it only when intentionally pushing the switch with the tip of an ungloved finger. Thus, there will not occur any unintentional touch. Moreover, even in a tumble of the motorcycle 2, the switch 29, accommodated to be flush with the side wall 1c, is kept free from being turned off by contact with another part.

When switch 29 is activated, all circuits, except for the switches 25 to 28, start functioning, so that the vehicle speed or the travel distance is displayed on the left display part 9 of the display section 1a, and the time, on the right display part 10 thereof, while varying with movements of the motorcycle 2 and the elapse of time, respectively. Upon the application of power, the select switch 38 is initialized to be set for the speed indication mode.

When having arrived at the start point of the race, the driver is to operate the timing switch to set anew the left display part 9 for the travel indication mode, and press on the calibration switch 25 for a period of four seconds or more before releasing. With such operations, the content of integration of the travel distance integration circuit 37 is cleared to zero and the stored content of the reference distance memory circuit 47 is displayed on the left display part 9. In this respect, the content of the memory circuit 47 is set, at the application of power, for a number of pulses correspondent to a number of the pulsatory signal waves to be given from the revolution number sensor 8 during a 3-mile travel of the individual vehicle on a paved road, whereas it will be encoded when being output as the distance display drive signal RE from the memory circuit 47.

Thereafter, the driver is to operate the correction switches 27, 28 to change the value of the reference distance stored in the memory circuit 47, while observing the left display part 9, as circumstances require. Such an operation may be needed in cases where the standard vehicle has travelled a distance different from three miles, such as a 2-mile distance or a 4-mile distance. Therefore, this operation is unnecessary, so far as the travel distance of the standard vehicle is three miles, except when the driver wants to ensure the reference distance by displaying the stored content of the memory circuit 47.

Then, the driver is to depress the calibration switch 25 for a period of approximately two seconds before releasing. As a result, with the calibration command signal CA given, the content of integration of the actual distance integration circuit 44 is cleared to zero, and the "CALSET" mark 24 on the display section 1a illuminates. Moreover, with the signal CA, the distance line terminal 54b of the switching circuit 54 is initially interconnected with the output terminal 53a of the addition-subtraction circuit 53.

At a point in time antecedent by at least four seconds to the start time of the race, the driver is to start pressing the timing switch 26. It is advisable to have earlier set the select switch 38 in the speed indication mode.

After an elapse of four seconds therefrom, while the timing switch 26 is kept pressed, the switch drive signal SW1 is output from the selection circuit 41 to the switching circuit 54. Thus, the clock line terminal 54c of the switching circuit 54 is interconnected with the output terminal 53a of the addition-subtraction circuit 53, and concurrently the reset signal RST1 is given to the counting circuit 50 of the clock line, thereby clearing the content of integration of the time integration circuit 51. In this case where the reference distance memory circuit 47 is disconnected from the switching circuit 54 and not driven to output the distance display drive signal RE therefrom, the current content of integration of the travel distance integration circuit 47 (to be of a zero value) is displayed on the left display part 9. At the right display part 10, a time of 00:00 is indicated in accordance with a signal from the time integration circuit 51 cooperating with the counting circuit 50 and the selection circuit 41, so long as the timing switch 26 is depressed.

When the start of the race is given, the driver is to release the timing switch 26 to stop supplying the reset signal RST1, whereby the counting circuit 50 of the clock line as well as the time integration circuit 51 enters a proper time integration work thereof, thus causing the indication on the right display part 10 to vary with the time.

After the start of the race, the driver is to voluntarily operate the timing switch 26 to change over the indication mode setting of the select switch 38, as circumstances require.

In the travel to the 3-mile point, even when the driver has erroneously touched the calibration switch 25 and/or the timing switch 26, there could not practically occur a situation that such an erroneous action lasts two seconds or longer, so that the meter unit 1 is kept free from accidental effects of such erroneous actions. Moreover, the correction switches 27, 28, which are structurally protected with the protection bar 30, could not substantially be operated in error.

When the vehicle arrives at the 3-mile point of the course, the driver is to depress the calibration switch 25 for two seconds before releasing, whereby the calibration command signal CA as of the second time is output from the selection circuit 46, thus turning off the "CAL-SET" mark 24, while fixing the content of integration of the actual distance integration circuit 44. Promptly, in the correction line, the correction factor calculation circuit 43 has calculated a new value of the correction factor in accordance with the actual distance signal C from the integration circuit 44 and the reference distance signal R from the reference distance memory circuit 47, whereas the correction factor has been set at the ratio of 1/1 till then. Thereafter, the thus obtained value of the correction factor is coded in the correction control signal S1 to be output from the calculation circuit 43. On the other hand, in the distance line, with the calibration command signal CA given as of the second time, the stored content of the memory circuit 55 (to be then zero) is added to the integral value of the travel distance integration circuit 37, while there will then be substantially resulted no variation in the integral value as will be easily understood. Moreover, with the calibration command signal CA given, the distance line terminal 54b of the switching circuit 54 is again interconnected with the output terminal 53a of the addition-subtraction circuit 53, so that the travel distance as integrated in the travel distance integration circuit 37 can be voluntarily corrected thereafter by use of the correction switches 27, 28. The above-described operations constitute a procedure for making a calibration for the first time after the application of power.

Also to each calibration for the second time or to be executed later, a similar procedure can be applied in consideration of respective circuit functions described hitherto.

Besides the foergoing functions, the switching circuit 54 is to provide, when the clock line terminal 54c thereof is interconnected with the output terminal 53a of the addition-subtraction circuit 53, a signal for stopping the integrating action of the time integration circuit 51, provided that the correction switch 27 is set in an "UP" position thereof while the correction switch 28 is then set in an "DOWN" position threof.

As will be understood for the foregoing description of the meter unit 1, according to the invention, in an enduro, when calibrating a travel distance characteristic of own vehicle by way of a comparison with a standard vehicle, it is permitted in any round of a race to correct a travel distance any number of times with ease, in accordance with conditions of a course, without exerting bad influences on travel distance data built up till then, so that a meter device for such service is successfully allowed to keep favorable accuracy thereof.

Further, according to the above-described embodiment, the calibration switch 25 as well as the timing switch 26 is to follow two applicable methods of select operation, that is, the short-period operation is pressed for approximately two seconds and the long-period operation is pressed for approximately four seconds, thereby each being permitted to have a plurality of functions, thus successfully achieving the reduction of a number of device components. Furthermore, with such an adaptation, the switches 25, 26 are effectively kept from being operated when erroneously depressed for a certain period that may last one second, so that the meter unit 1 is firmly prevented from accidential effects of such errors.

FIG. 6 is a block diagram showing a 100-th place distance line as the drive circuitry for driving the digit indication element 9b for the one-hundredth place in the left display part 9 of the display section 1a of the meter unit 1. FIG. 6 together with associated circuits of FIG. 5, while omitting indirectly related parts, show the 100-th place distance line has a division circuit 60, a correction circuit 61 as a multiplication-demultiplication circuit, and an integration circuit 62 for a distance integration of the one-hundredth place. The circuits 60 to 62 constitute a separate system with respect those circuits serving to drive the three digit indication elements 9a of the left display part 9. The system however is connected to the afore-said select switch 38 so that, any time when the left display part 9 is in the distance indication mode, also the 100-th place digit indication element 9b is activated.

It may well be advisable that, when assuming, whether or not a calibrating operation is completed, the correction control signal S1 output from the correction factor calculation circuit 43 has therein coded "a reference number of pulses correspondent to one-tenth miles to be 225". For example, then the correction circuit 36 of the distance line is controlled to output, each time after having received 225 pulses in total of the revolution number count signal P1 from the counting circuit 33, one pulse is output as the corrected revolution number signal P11 to the travel distance integration circuit 37.

Moreover, as well known, the driver is driving the motorcycle 2 by comparing, to make accord, respective contents of indication on the left and right display parts 9, 10 of the display section 1a with a given chart.

Referring again to FIG. 6, the correction control signal S1 is given to the division circuit 60 as well. At the division circuit 60, a first reference number of pulses in the control signal S1, which number is correspondent to one-tenth miles, is divided by a divisor of 10. When the first reference pulse number is divisible into an integral quotient, then the quotient is taken, as it is, to determine a second reference number of pulses correspondent to one-hundredth miles. When a quotient including a fraction of one decimal place is given, then the fraction is raised to a unit to be added to an integral part of the quotient, to thereby obtain the second reference pulse number. Accordingly, on the above assumption in which the first reference pulse number is 225, the second reference pulse number becomes 23.

The second reference pulse number is coded in another correction control signal S11 to be output from the division circuit 60 to the correction circuit 61, to which also the revolution number count signal P1 is input from the counting circuit 33 of the distance line. Each time after having received the second reference number of (23 on the above assumption) pulses in total of the count signal P1, the correction circuit 61 has one pulse output therefrom as a corrected revolution number signal P5 to the integration circuit 62. At the integration circuit 62, one figure representing the one-hundredth place of the travel distance is determined from the signal 5 by way of an integration, which figure is coded in a distance display drive signal H to be output therefrom to the 100-th place digit indication element 9b.

To the correction circuit 61 and the integration circuit 62 of the 100-th place distance line is output a reset signal RST2 from the travel distance integration circuit 37, to thereby reset the circuits 61, 62, each time when the circuit 37 has a unit added anew to one figure of the one-tenth place The distance indication of the 100-th place digit indication element 9b is available for such a service as follows.

It is now exemplarly supposed that an average travel speed of 30 mph (miles per hour) is specified in the given chart, or in other words, that a travel point on the course to pass by an elapse of 30:00 minutes after the start of the race is appointed to be at a distance of 15 miles. In such a situation, the driver is to observe the meter unit 1 at a time point antecedent approximately 10 seconds to the described check time, in order to accelerate or decelerate the vehicle with reference to the content of indication on the meter unit 1. For example, the content of indication may be "$14.9_2$ miles 29:50". In such case, the driver may well keep the vehicle speed as it is, determining that the vehicle is travelling substantially at the specified speed. To the contrary, when given such an indication as "$14.8_9$ miles 29:50", that is, the vehicle is travelling at a somewhat slower speeds that specified, the driver is then advised to raise the vehicle speed.

As will be understood from the foregoing description, according to the above embodiment, the travel distance of the vehicle has one figure of the one-hundredth place displayed for reference use, thus permitting the driver to forecast with ease the figure of the one-tenth place as the lowest place of numerals to be displayed on the three digit indication elements 9a in the travel indication mode.

Moreover, in the indication of travel distance, to determine the value of a figure correspondent to a place of one-hundredth miles, an advantage is to use the reference number of pulses employed for determining the value of another figure correspondent to a place of one-tenth miles. Although, with respect to the figure of the 100-th mile place, a deviation develops between a true travel distance and the displayed travel distance to an extent that may be approximately 1/23. Such a deviation will in no way provide problems, when considering the purpose of service of the digit indication element 9b. The 100-th place digit indication element 9b provided for reference may thus well be said remarkably useful.

Further, a signal for driving the 100-th place digit indication element 9b is produced in a particular circuitry without exerting influences on other circuits of the meter unit 1, thus permitting the meter unit 1 to fully exhibit a proper function thereof. In addition, the circuitry for the signal generation has a simple constitution and is inexpensive to manufacture.

Furthermore, the digit indication element 9b of the one-hundredth place is designed smaller in the size than each of the three digit indication elements 9a, and may preferably be ⅔ of the latter in both height and width dimensions, so that the driver is effectively permitted to firmly observe the travel distance and facilitated to refer to the 100-th place figure thereof. In this respect, the element 9b may preferably be differed from the elements 9a in the display color also, as already described.

There will be described below the configuration of the meter unit 1 including the switches 25 to 29 with reference to FIGS. 7A and 7B, which are a rear view and a right side view of the meter unit 1, respectively.

The meter unit 1 has, in the top face thereof, the display section 1a and the operational section 1b provided behind the display section 1a. The display section 1a is covered with a cover glass 100 upwardly swollen to be formed as a substantially rectangular lens stretched over the entire area of the display section 1a. In the configuration, the top face of the meter unit 1 is thus stepped along the boundary between the display section 1a and the operational section 1b. On the operational section 1b, there are provided the calibration switch 25, the timing switch 26, and the correction switches 27, 28 for slow or fast correction of the content of display on the display section 1a. The correction switch 27 is for a slow correction mode in which respective figures of a displayed numeral are corrected into a target value from the lowest place. The correction switch 28 is for a fast correction mode in which the displayed figures are corrected into the target value from the highest place. The calibration switch 25, as well as the timing switch 26, is of a press-on type. The correction switches 27, 28, are of a seesaw type to be tilted to the left and right to operate. Each of the switches 25 to 28 is protected with a rubber cap put thereon to be resistant against mud, water and the like.

As can be seen from FIGS. 7A, 7B, the calibration switch 25 as well as the timing switch 26 is upwardly projected from the face of the operational section 1b, to a predetermined height therefrom flush with or lower than the top surface of the cover glass 100 on the display section 1a. The correction switches 27, 28 have projections 27a, 28a thereof upwardly projected to be for switch operations thereof, respectively. The protection bar 30 has a top bar portion 30a positioned to be higher at the upper edge thereof than the respective upper ends of the projections 27a, 28a, and is frontwardly slanted at both side arm portions thereof so as to protect the correction switches 27, 28 from front with the top bar portion 30a interposed for isolation purpose between the display section 1a and the switches 27, 28.

At the left side of the meter unit 1, as shown in FIG. 4 also, there is provided the power switch 29, which comprises in the configuration a cylindrical body approximately 18 mm or smaller in the diameter. The power switch 29 is designed sinkable and projectable to be accommodated and projected with respect to the outer casing of the meter unit 1. The casing has formed therein a recess of like shape for accommodating the switch 29. Moreover, the meter unit 1 has formed on a bottom portion 1d thereof a cell box 31 downwardly projected therefrom for accommodating the cell as a power source.

According to the above embodiment, in which the press-on type switches 25, 26 are not taller than the top surface of the cover glass 100 on the display section 1a and the seesaw type switches 27, 28 are provided with the protection bar 30, the switches 25 to 28 on the operational section 1b are all possibly protected safe against the driver's unintentional touch in the race. Likewise, a complete protection against the driver's unintentional touch is made for the power switch 29 which, when pushed on, sinks in a side wall portion of the outer casing of the meter unit 1, to be flushed therewith.

There will be described below the fixing structure of the meter unit 1 to be mounted on the stay 7, with reference to FIGS. 8A to 8G.

Referring first to FIG. 8A, as already described, the meter unit 1 is provided in the vicinity of the handle bar 3 of the motorcycle 2. More particularly, the meter unit 1 is installed, between the handle bar 3 and the racing number plate 4, on the stay 7 fixed by the bolts 6 to the upper holder 5 of the handle bar 3. The holder 5 also is fixed by the bolts 6. The racing number plate 4, stretched around a head light 106, is fastened at both sides thereof to the front fork 11 by left and right pair of vertically spaced apart rubber bands 107, respectively.

Referring now to FIG. 8G, each of the rubber bands 107 is provided at the free end thereof with a latch piece 107a and has at the proximal end thereof a locking portion 107b formed thereon for locking the latch piece 17a, to thereby fasten to secure the racing number plate 4 to the front fork 11, so that the number plate 4 can be attached and detached with ease to and from the vehicle body. The racing number plate 4 is arranged to be stretched in front of the the meter unit 1, in close vicinity thereto, thus effectively protecting same.

Referring now to FIGS. 8B and 8C illustrating a fixing procedure to the meter unit 1 to the stay 7. The stay 7 comprises a rectangular flat frame having on the rear edge thereof a pair of projections 110. Each projection respectively projects therefrom and is formed with one of a pair of bolt holes 109 for providing therethrough either of the aforesaid bolts 6. A central opening 7b is defined by the rectangular frame, in which opening 7b the cell box 31 of the meter unit 1 is to be fitted. The cell box 31 is projected from the bottom portion 1d, which is rectangular, of the meter unit 1 and configured to be rectangular, while having in the lower part thereof a horizontally outwardly flanged bottom portion 113. The entirety of the flanged portion 113 is shaped into a rectangular form larger than the body of the cell box 31. A neck space 114 is defined between the flanged portion 113 of the cell box 31 and the bottom portion 1d of the meter unit 1. When fixing the meter unit 1, the stay 7 is to be placed in the neck space 114 so as to loose-fit on the cell box 31, after having likewise placed a cushioning member 115, which also has a rectangular central opening 115a, substantially of the same size as the flanged portion 113.

As seen from FIG. 8C, the cell box 31 of the meter unit 1 is thus provided through the opening 115a of the cushioning member 115 and the opening 7b of the stay 7, with a gap left between the stay 7 and the flanged portion 113. In the gap, a clip 116 is to be applied to check the flanged portion 113. The clip 116 comprises a single wire segment as folded into a form having in the middle thereof a pick-up portion 116a and on both sides thereof either of a pair of pinch stem portions 116b. As will be understood from FIGS. 8A, 8C, and 8F, the clip 116 is insertable and removable from front of the meter unit 1, as it is fixed to the stay 7, that is, from the side of the racing number plate 4.

Refer now to FIG. 8D, which is a rear view of the meter unit 1 as fixed to the stay 7 as shown partly in section, and FIG. E, which is a bottom view of the meter unit 1 of FIG. 8D. The meter unit 1 as fixed to the stay 7 has the pinch stem portions 116b of the clip 116 applied to be interposed between the stay 7 and the flanged portion 113 of the cell box 31, and the pick-up portion 116a thereof projected frontwardly of a front edge 7a of the stay 7.

Refer now to FIG. 8G, which is an enlarged left side view, partly in section, of an essential part of the meter unit 1 of FIG. 8D. The flanged portion 113 of the cell box 31 has, inside of the circumferential edge thereof, an upper face 113a downwardly tapered, so that the stem portions 116b of the clip 116 is forcibly pinched between the flanged portion 113 and the stay 7 which is subjected to elastic forces of the cushioning member 115. As shown in FIG. 8G, the cushioning member 115 as applied has a sectional configuration thereof elastically deformed to be stepped by intrusion of the stay 7.

As will be understood from the foregoing description, according to the above embodiment, a fixing structure of the meter unit 1 is constituted with no more than the stay 7, the cushioning member 115, and the clip 116, thus successfully effecting the reduction in number of components, when compared with a conventional bolt and nut system.

Moreover, the meter unit 1 can be attached and detached to and from the vehicle body simple by insertion and pick-out of the clip 116, thus achieving facilitations of service to be appreciated, particularly in the conveniency to hand-carry which will effectively prevent the meter unit 1 against theft that might occur when the meter unit 1 is left fixed to the motorcycle 2.

In this respect, according to the embodiment, the clip 116 is to be applied to and removed from the meter unit 1 at the front thereof where the racing number plate 4 is disposed while covering the meter unit 1, so that for a person other than the driver, when trying to steal the meter untill 1, it will take too much labor to remove it in a stealthy way, whereas the driver is permitted to have available remarkable facilitations for the attachment as well as detachment of the meter unit 1 requiring as a preliminary step no more than removing the racing number plate 4, which is simply fastened by the rubber bands 107 to the front fork 11 and does not need much time for the removal.

Further, the cushioning member 115 is interposed between the meter unit 1 and the stay 7, making use of the elasticity to secure the fixing of the meter unit 1 to the stay 7, while protecting the meter unit 1 from vibrations of the motorcycle 2. Furthermore, the meter unit 1 itself is seated on the cushioning member 115 and therefore, even while receiving external forces at the side of the operational section 1b, it is kept elastically supported, thus securing associated switch operations.

In the cell box 31 provided at the bottom of the meter unit 1, the upper face 113a of the flanged portion 113 is properly tapered, so that, even when the cushioning member 115 is deteriorated over time, the meter unit 1 will not have backlashes thereof over-developed.

There will be described below an essential point to be considered in relation to the operation of the aforesaid correction switches 27, 28.

In an enduro, while the motorcycle 2 is travelling, the display section 1a of the meter unit 1 may well be covered with dust, mud, and the like to the extent that the content of display could not read, thus needing a wiping. In such a case, the driver, who usually has put on thick gloves, may operate a certain switch or switches on the operational section 1b in error. In this respect, similarly to conventional ordinary offroad-oriented motorcycles, the motorcycle 2 has on the handle bar 3 a transversely extending cross bar (not shown) integrally fixed thereto for reinforcement purpose, so that the wiping movement of hands tends to be transverse. Such hand actions are likely to occur due to the design of the meter unit 1 as well, in which the display section 1a is transversely arranged, whereas such a layout is standard in the related field of art.

In this respect, the correction switches 27, 28 according to the embodiment are effectively preventing erroneous operations thereof due to such hand actions of the driver.

There will be described below three modified examples with respect to the correction switches 27, 28 of the rally-oriented meter device according to the above embodiment of the invention, in conjunction with FIGS. 9A, 9B; 10A, 10B; and 11A, 11B, through which like parts are designated by like reference characters in relation to the above embodiment.

Refer first to FIG. 9A, which is a perspective view of an essential part of a rally-oriented meter device according to a first modified example of the embodiment, and FIG. 9B, which is a left side view of the essential part of FIG. 9A. The meter device includes a meter unit 1 having in an operational section 1b thereof a pair of correction switches 127, 128 of a seesaw type. Though being similar to the aforesaid switches 27, 28 in the structure, the correction switches 128, 128 are to be operated by tilting frontwardly and rearwardly, thus successfully preventing erroneous operations thereof due to transverse hand actions.

According to the first example, no protection bar is necessary, so that the number of components can be reduced, like the remaining two modified examples.

As shown in FIG. 9B, as well as the correction switch 127, the correction switch 128 has the top face thereof positioned higher than the top surface of a cover glass 100 on a display section 1a of the meter unit 1.

Refer now to FIGS. 10A and 10B, which are views similar to FIGS. 9A and 9B, respectively, showing an essential part of a rally-oriented meter device according to a second modified example of the embodiment. The meter device includes a meter unit 1 having in an operational section 1b thereof a pair of correction switches 227, 228 similar to the aforesaid switches 27, 28 and leftwardly and rightwardly tiltable for operation. A cover glass 200 is provided to protect a display section 1a of the meter unit 1 and has integrally formed thereon, along the rear edge thereof, an upwardly projected rib 200a for a service similar to that of the aforesaid protection bar 30. The rib 200a is transversely extended along the boundary between the display section 1a and the operational section 1b, and has a transverse length exceeding, at both ends thereof, respective corresponding outside edges of the correction switches 227, 228.

As shown in FIG. 10B, the rib 200a has an upper edge 200b thereof positioned higher than a top part 228a of the correction switch 228, as well as such part of the correction switch 227.

Refer now to FIGS. 11A and 11B, which are views similar to FIGS. 9A and 9B, respectively, showing an essential part of a rally-oriented meter device according to a third modified example of the embodiment. The meter device includes a meter unit 1 having in an operational section 1b thereof a pair of correction switches 327, 328 of a rocking type to be rocked for operation to the right or left, as circumstances require, by pushing right top faces 327a, 328a thereof or left top faces 327b, 328b thereof, notwithstanding the first and second modified examples in which each switch is to be tilted leftwardly and rightwardly or frontwardly and rearwardly by applying an operational force to a central part of the switch.

As shown in FIG. 11B, as well as the correction switch 327, the correction switch 328 has a top end part 328c thereof positioned slightly lower than the top surface of a cover glass 100 on a display section 1a of the meter unit 1.

According to the third example, the correction switches 327, 328 have a configuration difficult to operate in error by a transverse hand action.

The present invention is applicable to various meter devices other than rally-oriented, too.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

What is claimed is:

1. A rally-oriented meter device for a motorcycle having a handle bar and a road wheel, comprising:
   a meter;
   a fixing means for detachably fixing said meter in the vicinity of said handle bar wherein said fixing means includes
      a projected part projected from said meter,
      a flanged part circumferentially formed on said projected part,
      a cushioning member formed with an opening for inserting therethrough said flanged part, and fitted on said projected part,
      a stay member formed with an opening for inserting therethrough said flanged part, and secured to said handle bar, and
      a clip member to be inserted between said flanged part and said stay member, as said cushioning member is fitted on said projected part and said flanged part is inserted through said opening of said stay member;
   a speed sensor for detecting a number of revolutions of said road wheel;
   internal circuit means built in said meter for receiving an output signal from said speed sensor, said speed sensor is fixed in the vicinity of the upper part of a front fork of said motorcycle, and said speed sensor is disconnectably connected through a connector means to said internal circuit means in said meter;
   power source means for supplying electric power to said internal circuit means;
   display means disposed on the outside of said meter for receiving an output signal from said internal circuit means and for displaying at least a travel distance of said motorcycle;
   switch means disposed on the outside of said meter and connected to said internal circuit means to provide a control signal to said internal circuit means;

said internal circuit means including travel distance integration circuit means for receiving said output signal from said speed sensor to execute an integration of said travel distance and for providing a drive signal which is a value of said integration of said travel distance to be displayed on said display means; and correction signal providing circuit means for providing a correction signal which is a correction factor for correcting said output signal from said speed sensor which is input to said travel distance integration means; and said switch means including calibration switch means for providing said control signal indicating a starting of and a stopping of an action to determine said correction factor to said correction signal providing circuit means.

2. A rally-oriented meter device according to claim 1, wherein:

said internal circuit means further includes selection circuit means connected to said calibration switch means; and said selection circuit means provides, when said calibration switch means is kept operated for a first predetermined time, said control signal to said correction signal providing circuit means.

3. A rally-oriented meter device according to claim 2, wherein:

said travel distance integration circuit means comprises:
 a correction circuit for receiving said output signal from said speed sensor and said correction signal from said correction signal providing circuit means and for producing a predetermined signal each time when said motorcycle has travelled a predetermined unit distance;
 a distance integration circuit for receiving said predetermined signal from said correction circuit to integrate said travel distance of said motorcycle; and
 a memory circuit for storing said content of said integration of said distance integration circuit.

4. A rally-oriented meter device according to claim 3, wherein:

when siad calibration switch means is operated for a second predetermined time longer than said first predetermined time, said selection circuit means produces a select signal and provides said select signal to said travel distance integration circuit means;

said control signal produced by said calibration switch means is further provided to said distance integration circuit;

when said distance integration circuit is given said select signal for the first time after an application of said electric power, said distance integration circuit clears out said current value of said integration and, when given said select signal thereafter, said distance integration circuit sends said current value of said integration to said memory circuit before clearing the same; and when said distance integration circuit is given said control signal two times after having once received select signal said distance integration circuit adds a current value of a memory as stored in said memory circuit to said value of said integration.

5. A rally-oriented meter device according to claim 4, wherein:

said value of said memory circuit is cleared when said power source means is put in service.

6. A rally-oriented meter device according to claim 3, wherein:

said display means comprises a travel distance display part having a first display element for displaying said travel distance of said motorcycle in said predetermined unit by a first predetermined number of figures, and a second display element for displaying said travel distance in a unit smaller by one place than said predetermined unit by a second predetermined number of figures; and said internal circuit means further includes referential distance integration circuit means for receiving said output signal from said speed sensor and said correction signal from said correction signal providing circuit means for providing a drive signal to said second display element.

7. A rally-oriented meter device according to claim 6, wherein:

said first display element is different in display color from said second display element.

8. A rally-oriented meter device according to claim 1, wherein:

said display means comprises a clock display part and a vehicle speed display part; and said internal circuit means further includes clock circuit means for a time integration and to provide a display drive signal to said clock display part, and a vehicle speed calculation circuit means connected to said speed sensor and to said clock circuit means and to provide a display drive signal to said vehicle speed display part.

9. A rally-oriented meter device according to claim 1, wherein:

said stay member is secured to said handle bar, so as to frontwardly extend therefrom; and said projected part is formed at the bottom of said meter proper.

10. A rally-oriented meter device according to claim 9, wherein:

said clip member is inserted, at the front of said meter proper, between said flanged part and said stay member.

11. A rally-oriented meter device according to claim 10, wherein:

said motorcycle has a cover member to be disposed in close vicinity to, while covering, the front part of said meter as fixed to said stay member, and to be detachably attached to a body part of said motorcycle.

12. A rally-oriented meter device according to claim 11, wherein:

said cover member comprises a racing number plate detachably attached to said front fork.

13. A rally-oriented meter device according to claim 1, wherein:

said opening of said cushioning member is substantially equal in size to said projected part.

14. A rally-oriented meter device according to claim 1, wherein:

said fixing means is for fixing said meter in front of a substantially central part of said handle bar of said motorcycle;

said display means and said switch means on said meter comprises a display section provided in an upper face of said meter and a switch group disposed in an operational section provided in said upper face of said meter;

said upper face of said meter has between said display section and said operational section a stepped portion for making a top face of said display section higher than said operational section;

said switch group comprises at least a calibration switch constituting said calibration switch means; and said calibration switch comprises a press-on type switch projecting from said operational section to have a top face thereof lower than said top face of said display section.

15. A rally-oriented meter device according to claim 14, wherein:

said display section is provided on said upper face of said meter proper, at the far side thereof from said handle bar;

said operational section is provided on said upper face of said meter proper, at the near side thereof to said handle bar; and said switch group is connected to said travel distance integration circuit means, and further comprises at least one correction switch for correcting said content of said integration of said travel distance integration circuit means.

16. A rally-oriented meter device according to claim 15, wherein said correction switch comprises a seesaw type switch, when said correction switch is tilted to be operated to the left, and then to the right, said correction switch exhibits a given function thereof; and said operational section has a protection member disposed between said display section and said correction switch and formed to be higher at the upper end thereof than the upper end of said correction switch.

17. A rally-oriented meter device according to claim 15, wherein:

said correction switch comprises a seesaw type switch to, when tilted to be operated to the left and then right, exhibit a given function thereof;

said display section is provided with a cover glass extending over the entire area of said display section; and said cover glass has along the rear edge thereof a rib formed, integrally therewith, to be higher at the upper edge thereof than the upper end of said seesaw type switch.

18. A rally-oriented meter device according to claim 15, wherein:

said correction switch comprises a seesaw type switch to, when frontwardly and rearwardly tilted to be operated, exhibit a given function thereof.

19. A rally-oriented meter device according to claim 15, wherein:

said correction switch comprises a rocking type switch to, when rocked to be operated to the left and then right, exhibit a given function thereof; and said rocking type switch is lower at the upper end thereof than said top face of said display section.

20. A rally-oriented meter device according to claim 14, wherein:

said meter has on a side wall thereof a power switch serving for said power source; and said power switch being a push-button switch which extends into and projects out of a recess in said meter to, when turned on, become flushed with said side wall of said meter.

21. A rally-oriented meter device according to claim 20, wherein:

said power switch is configured to be of a cylindrical form with a diameter not exceeding approximately 18 mm.

22. A rally-oriented meter device for a motorcycle having a handle bar and a road wheel, comprising:

a meter;

fixing means for fixing said meter in the vicinity of said handle bar;

a speed sensor for detaching a number of revolutions of said road wheel;

internal circuit means built in said meter for receiving an output signal from said speed sensor;

power source means for supplying electric power to said internal circuit means;

display means disposed on the outside of said meter for receiving an output signal from said internal circuit means and for displaying at least a travel distance of said motorcycle;

switch means disposed on the outside of said meter and connected to said internal circuit means to provide a control signal to said internal circuit means;

said internal circuit means including:

travel distance integration circuit means for receiving said output signal from said speed sensor to execute an integration of said travel distance and for providing a drive signal representing a value of said integration of said travel distance to be displayed on said display means; and correction signal providing circuit means for providing a correction signal representing a correction factor for correcting said output signal from said speed sensor which is input to said travel distance integration circuit means; and said switch means including calibration switch means for providing said control signal indicating a starting of and a stopping of an action to determine said correction factor to said correction signal providing circuit means;

said travel distance integration circuit means comprises a correction circuit for receiving said output signal from said speed sensor and said correction signal from said correction signal providing circuit means and for producing a predetermined signal each time when said motorcycle has traveled a predetermined unit distance, a distance integration circuit for receiving said predetermined signal from said correction circuit to integrate said travel distance of said motorcycle, and a memory circuit for storing said value to said integration of said distance integration circuit;

said internal circuit means further includes selection circuit means connected to said calibration switch means; and said selection circuit means provides, when said calibration switch means is operated for a first predetermined time, said control signal to said correction signal providing circuit means;

when said calibration switch means is operated to a second predetermined time longer than said first predetermined time, said selection circuit means produces a select signal and provides said select signal to said travel distance integration circuit means;

said control signal produced by said calibration switch means is further provided to said distance integration circuit;

when said distance integration circuit is given said select signal for the first time after an application of said electric power, said distance integration circuit clears out said current value of said integration and, when given said select signal thereafter, said distance integration circuit sends said current value of said integration of said memory circuit before clearing the same; and when said distance integration circuit is given said control signal two times after having once received said select signal, said distance interpretation circuit adds a current value of a memory as stored in said memory circuit to said value of said integration; and said correction signal providing circuit means comprises an actual distance integration circuit for receiving said output signal from said speed sensor and said control signal, when said actual distance integration circuit is given said control signal for an odd-numbered time after said application of said electric power, said actual distance integration circuit clears a current value of integration and, thereafter, integrates said travel distance of said motorcycle on the basis of said output signal from said speed sensor and, when said actual distance information circuit is given said control signal for the even-numbered time subsequent to said odd-numbered time, said actual distance integration circuit fixes said current value of integration and produces a distance integration signal representing said value of integration, a reference distance memory circuit for storing a predetermined reference distance and to output a reference distance signal which is a current value of memory as stored, and a correction factor calculation circuit for receiving said distance integration signal and said reference distance signal to calculate a correction factor and for providing said correction signal representing said correction factor to said correction circuit of said travel distance integration circuit means.

23. A rally-oriented meter device according to claim 22, wherein:

said correction factor calculation circuit is to, just after said application of said electric power, output said correction signal, having set said correction factor at a one-to-one ratio, and, when given said distance integration signal representing said value of integration of said actual distance integration circuit, said value of integration not lying within a predetermined proportion of said predetermined reference distance signal as represented by said reference distance signal, said correction factor calculation circuit stops a calculation of said correction factor and, thereafter, outputs said correction signal, having set said correction factor at one-to-one.

24. A rally-oriented meter device according to claim 23, wherein:

said predetermined proportion is substantially within a range of 90% to 110%.

25. A rally-oriented meter device according to claim 22, wherein:

said display means has a calibration indicator for indicating an execution of a calibration to determine said correction factor of said correction signal providing circuit means; and said calibration indicator is for receiving said control signal from said calibration switch means, when given said control signal for an odd-numbered time after said application of said electric power said indicator being activated and, when given said control signal for the even-numbered time subsequent to said odd-numbered time said indicator being deactivated.

26. A rally-oriented meter device for a motorcycle having a handle bar and a road wheel, comprising:

a meter;

fixing means for fixing said meter in the vicinity of said handle bar;

a speed sensor for detecting a number of revolutions of said road wheel;

internal circuit means built in said meter for receiving an output signal from said speed sensor;

power source means for supplying an electric power to said internal circuit means;

display means disposed on the outside of said meter for receiving an output signal from said internal circuit means and for displaying at least a travel distance of said motorcycle;

switch means disposed on the outside of said meter and connected to said internal circuit means to provide a control signal to said internal circuit means;

said internal circuit means including
 travel distance integration circuit means for receiving said output signal from said speed sensor to execute an integration of said travel distance and for providing a drive signal representing a value of said integration of said travel distance to be displayed on said display means; and
 correction signal providing circuit means for providing a correction signal representing a correction factor for correcting said output signal from said speed sensor which is input to said travel distance integration circuit means; and said switch means including calibration switch means for providing said control signal indicating a starting of and a stopping of an action to determine said correction factor to said correction signal providing circuit means;

said travel distance integration circuit means comprises
 a correction circuit for receiving said output signal from said speed sensor and said correction signal from said correction signal providing circuit means and for producing a predetermined signal each time when said motorcycle has traveled a predetermined unit distance,
 a distance integration circuit for receiving said predetermined signal from said correction circuit to integrate said travel distance of said motorcycle, and
 a memory circuit for storing said value of said integration of said distance integration circuit;

said internal circuit means further includes selection circuit means connected to said calibration switch means, said selection circuit means provides, when said calibration switch means is operated for a first predetermined time, said control signal to said correction signal providing circuit means; wherein said display means comprises a travel distance display part having a first display element for displaying said travel distance of said motorcycle in said predetermined unit by a first predetermined number of figures, and a second display element for displaying said travel distance in a unit smaller by one place than said predetermined unit by a second predetermined number of figures;

said internal circuit means further includes referential distance integration circuit means for receiving said output signal from said speed sensor and said correction signal from said correction signal providing circuit means and for providing a drive signal to said second display element;

said referential distance integration circuit means comprises
- a division circuit for receiving said correction signal, and to divide said correction factor represented by said correction signal by a ratio between said predetermined unit and said unit lower by one place to determine a second correction factor and output a second correction signal representing said second correction factor,
- a correction circuit for receiving said output signal from said speed sensor and said second correction signal from said division circuit, and to, each time when the motorcycle travels a distance in said unit lower by one place than said predetermined unit, produce a second predetermined signal, and
- an assistant integration circuit for receiving said second predetermined signal to execute an integration of said travel distance of said motorcycle, and for providing a drive signal representing a value of said integration to said second display element.

27. A rally-oriented meter device according to claim 26, wherein:
said second display element comprises a single indication element for indicating one figure of the lowest place of said travel distance in said unit lower by one place than said predetermined unit.

28. A rally-oriented meter device according to claim 27, wherein:
said single indication element constituting said second display element is smaller in size than each of indication elements representing figures of respective places of said first display element.

29. A rally-oriented meter device according to claim 28, wherein:
said single indication element constituting said second display element is disposed in close vicinity to said first display element.

30. A rally-oriented meter device according to claim 29, wherein:
said single indication element constituting said second display element is substantially $\frac{2}{3}$ in both height and width dimensions of each of said indication elements representing said figures of said respective places of said first display element.

31. A rally-oriented meter device for a motorcycle having a handle bar and a road wheel, comprising:
a meter;
fixing means for fixing said meter in the vicinity of said handle bar;
a speed sensor for detecting a number of revolutions of said road wheel;
internal circuit means built in said meter for receiving an output signal from said speed sensor;
power source means for supplying electric power to said internal circuit means;
display means disposed on the outside of said meter for receiving an output signal from said internal circuit means and for displaying at least a travel distance of said motorcycle;
switch means disposed on the outside of said meter and connected to said internal circuit means to provide a control signal to said internal circuit means;
said internal circuit means including:
travel distance integration circuit means for receiving said output signal from said speed sensor to execute an integration of said travel distance and for providing a drive signal representing a value of said integration of said travel distance to be displayed on said display means; and
correction signal providing circuit means for providing a correction signal representing a correction factor for correcting said output signal from said speed sensor which is input to said travel distance integration circuit means; and
said switch means including calibration switch means for providing said control signal indicating a starting of and a stopping of an action to determine said correction factor to said correction signal providing circuit means, wherein said correction signal providing circuit means comprises a means for determing whether or not a value of said drive signal falls within a predetermined range, a center value of said range being a reference value, said correction signal providing circuit means also comprising a means for fixing said correction factor at a one-to-one ratio when said value of said drive signal does not fall within said range, whereby a correction does not occur due to the correction factor being one-to-one.

* * * * *